United States Patent
Rieley et al.

(10) Patent No.: US 6,208,638 B1
(45) Date of Patent: *Mar. 27, 2001

(54) METHOD AND APPARATUS FOR TRANSMISSION AND RETRIEVAL OF FACSIMILE AND AUDIO MESSAGES OVER A CIRCUIT OR PACKET SWITCHED NETWORK

(75) Inventors: Jack Rieley; Jaye Muller, both of New York, NY (US)

(73) Assignee: j 2 Global Communications, Inc., Hollywood, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,857

(22) Filed: Apr. 1, 1997

(51) Int. Cl.[7] .............................. H04L 12/66; H04M 7/00
(52) U.S. Cl. ..................... 370/354; 370/401; 379/88.17; 379/100.08; 379/221; 709/227
(58) Field of Search ................................ 370/352, 354, 370/428, 396, 401; 379/88.17, 100.01, 100.08, 100.17, 100.12, 265, 221, 89; 709/217, 218, 227, 219; 341/20

(56) References Cited

U.S. PATENT DOCUMENTS

| | | | |
|---|---|---|---|
| 5,113,430 | * 5/1992 | Richardson, Jr. et al. | 379/88.17 |
| 5,351,276 | * 9/1994 | Doll, Jr. et al. | 370/354 |
| 5,557,659 | * 9/1996 | Hyde-Thomson | 379/88.13 |
| 5,737,395 | * 4/1998 | Irribarren | 379/88.13 |
| 5,812,639 | * 9/1998 | Bartholomew et al. | 379/89 |
| 5,911,776 | * 6/1999 | Guck | 709/217 |
| 5,930,493 | * 7/1999 | Ottesen et al. | 709/227 |
| 5,933,490 | * 8/1999 | White et al. | 379/221 |
| 5,946,386 | * 8/1999 | Rogers et al. | 379/265 |
| 5,991,292 | * 11/1999 | Focsaneanu et al. | 370/352 |
| 5,996,006 | * 11/1999 | Speicher | 709/218 |
| 6,009,469 | * 12/1999 | Mattaway et al. | 709/227 |
| 6,084,892 | * 7/2000 | Benash et al. | 370/401 |
| 6,108,329 | * 8/2000 | Oyama et al. | 370/352 |

* cited by examiner

*Primary Examiner*—Hassan Kizou
*Assistant Examiner*—John Pezzlo
(74) *Attorney, Agent, or Firm*—Blakely Sokoloff Taylor & Zafman

(57) ABSTRACT

A method and apparatus for accepting an incoming message over a circuit switched network and transmitting it over a packet switched network. The apparatus including means for implementing the steps of receiving an incoming call signal along with a inbound address; determining a user account and a final address on said packet switched network associated with said inbound address; allocating a message processing resource; processing said incoming call into a processed message; and, sending said processed message to said final address.

22 Claims, 3 Drawing Sheets

METHOD AND APPARATUS FOR TRANSMISSION AND RETRIEVAL OF FACSIMILE AND AUDIO MESSAGES OVER A CIRCUIT OR PACKET SWITCHED NETWORK

BACKGROUND OF THE INVENTION

1. Field of the Invention

The present invention relates to the field of message receipt/transmission and delivery using computer networks. Specifically, the present invention relates to the subject of facsimile and voice transmission and retrieval over circuit/packet switched voice/data networks.

2. Description of Related Art

Voice and data communications systems such as the public switched telephone network (PSTN) are currently used to transfer image and text data transmitted by facsimile ("fax") machines in addition to the normally carried voice traffic. These faxed images are usually transmitted through the PSTN and received for printout or storage of the image on a destination fax machine or computer for the use by the recipient. Since the destination machine has typically been a fax, computer, printer or other such large capacity storage and output device, there has not been a need to compress the fax significantly for the destination output device. Furthermore, as the traditional destination has been either a full size print-out, computer monitor or mass storage media, no attempt has been made to facilitate the delivery of fax messages using other methods so as not to require the recipient to be physically close to the device which is coupled to the telephone line in order to receive the fax message.

For example, where user A has a fax machine connected to the PSTN using a telephone line with a number "XXX-YYY-ZZZZ" (where "XXX" represents the area code of the number, "YYY" the prefix of the number, and "ZZZZ" the remainder of the number), in order for user A to view a received fax message, user A must be physically located in the same area as the fax machine.

Similarly, audio messages are stored on fixed destination devices such as answering machines and "voice-mail" systems. To retrieve such audio messages, a recipient would either have to dial into the destination device or physically activate the play-back of audio messages through manipulation of the controls of an answering machine.

Thus, the ability to access both voice and fax messages from additional locations which would not require a user to either (1) be physically stationed near the receiving fax machine; or (2) to have to manually call a device to retrieve audio messages; would be desirable.

In addition, as a sender currently has to call or fax directly to the destination phone or fax machine, the sender incurs additional charges imposed by one or more telephone companies handling the call. Depending on the length of the fax or audio message, the telephone company charges can be substantial as calls are billed based on the time connected.

Hence, to be able to provide a sender with multiple phone numbers to which to send a message would be desirable, allowing the sender to choose the number which would closest, and, thus, the least expensive, to dial into.

SUMMARY OF THE INVENTION

To provide for the receipt and transmission of audio and fax information by a first user over a circuit switched network such as the PSTN to a second user over a packet switched network such as the Internet, a communications server is connected both to the circuit switched network and a packet switched network.

The communications server contains resources to receive and process incoming audio and facsimile calls from the circuit switched network into a format suitable for transmission over the packet switched network to the second user's address. In addition, a link is first determined between the second user's address on the circuit switched network and the second user's address on the packet switched network, and then an appropriate route to the second user's address on the packet network is determined. With the system being maintained in a distributed and redundant fashion, reliable receipt and transfer of all messages is ensured.

Thus, this electronic messaging system allows for the transfer of messages such as facsimile and audio messages from the circuit switched network to be collected and routed over the packet switched network.

DETAILED DESCRIPTION OF THE INVENTION

The present invention provides a method and apparatus for allowing the receipt and transmission of audio and fax information between a circuit switched network and a packet switched network. For purposes of explanation, specific embodiments are set forth to provide a thorough understanding of the present invention. However, it will be understood by one skilled in the art, from reading this disclosure, that the invention may be practiced without these details. Further, although the present invention is described through the use of circuit switched and packet switched networks, most, if not all, aspects of the invention apply to all networks in general. Moreover, well-known elements, devices, process steps and the like are not set forth in detail in order to avoid obscuring the present invention.

Figure 1:
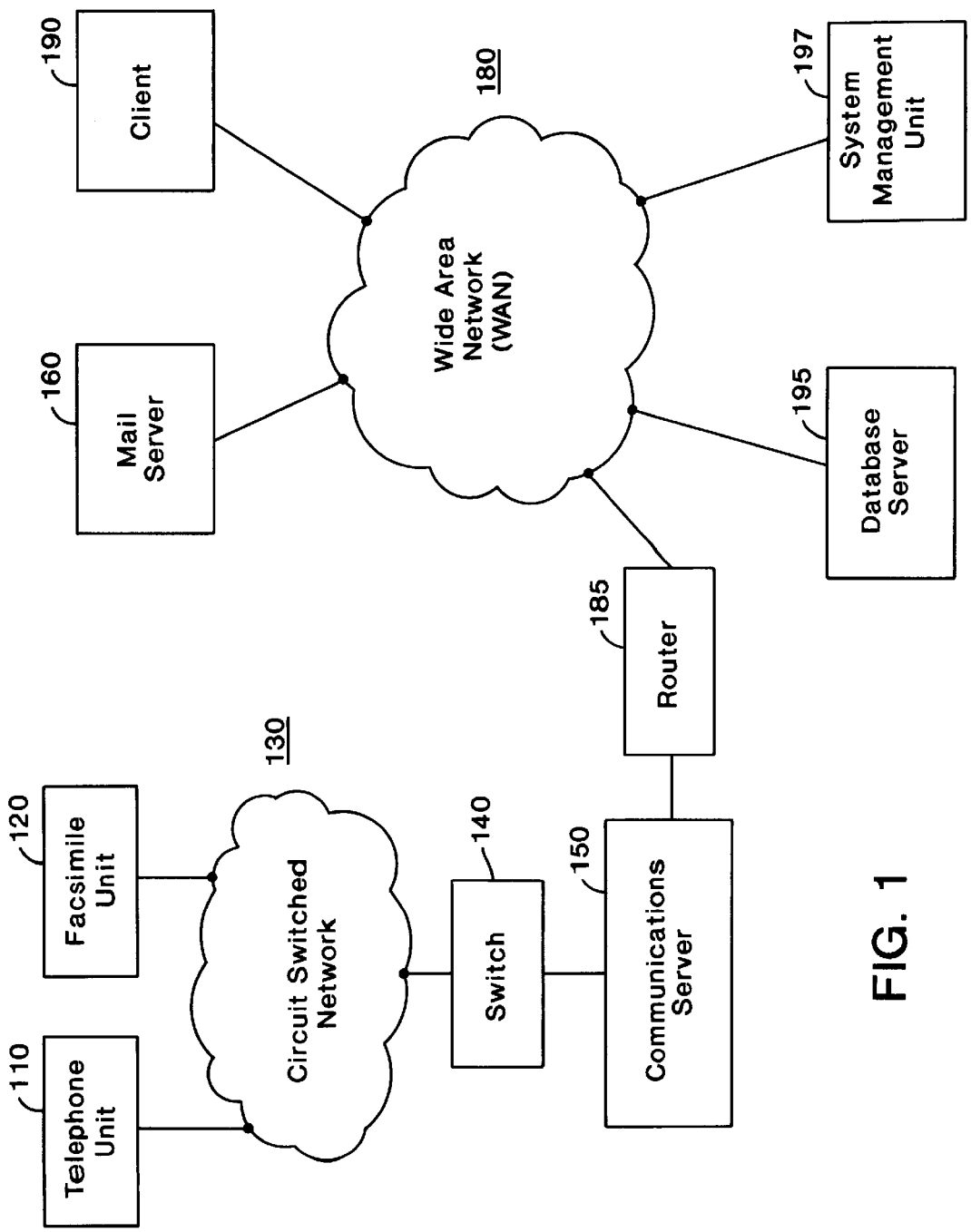
FIG. 1 is a system diagram of a network configured pursuant to a preferred embodiment of the present invention containing a message server.

FIG. 1 contains a block diagram illustrating a system configured in accordance with a preferred embodiment of the present invention containing a communications server 150 connected to a circuit switched network 130 and a wide area network (WAN) 180. In the preferred embodiment, circuit switched network 130 is a circuit switched network such as the PSTN while WAN 180 is a packet switched network such as the Internet. It is to be noted that circuit switched network 130 can also be a network such as the generalized switched telephone network (GSTN), which encompasses PSTN networks, cellular telephone networks, and the other networks with which they are in communication.

Communications server 150 is connected to circuit switched network 130 via a switch 140 and to WAN 180 through the use of a router 185. As described in further detail below, in a preferred embodiment, switch 140 and router 185 are interfaced to communications server 150 using two separate hardware interfaces. In an alternate embodiment, switch 140 and router 185 can be interfaced to communications server 150 through the use of one hardware unit.

Connected to circuit switched network 130 is both a telephone unit 110 and a facsimile unit 120. Telephone unit 110 is a standard telephone capable of converting audio signals into electrical signals suitable for transmission over circuit switched network 130. Similarly, facsimile unit 120 is a standard facsimile machine capable of transmitting and receiving facsimile messages over circuit switched network 130. Each of these devices can be connected to circuit switched network 130 using either wired or wireless technology.

Connected to WAN 180 is a database server 195, a system management unit 197, a mail server 160, and a client 190. Each of these systems communicate with each other and with communications server 150 via WAN 180 using such protocols such as simple network management protocol (SNMP) and hyper-text transport protocol (HTTP)—packetized using a protocol such as the transmission control protocol/internet protocol (TCP/IP).

In the preferred embodiment, each one of database server 195, system management unit 197, mail server 160, and client 190, are stand-alone computers or workstations containing the hardware and software resources to enable the operation of the present invention. In alternate embodiments, the functions provided by each one of database server 195, system management unit 197, mail server 160, and client 190, are provided by any number of computer systems.

In the preferred embodiment, mail server 160 is a server providing e-mail receipt and transmission using a protocol such as the simple mail transfer protocol (SMTP) and post office protocol (POP). Moreover, client 190 is configured to be able to communicate over WAN 180 using SMTP or POP in order to retrieve email from mail server 160 or another suitably configured server.

System management unit 197 communicates with communications server 150 to monitor: (1) the processes on communications server 150; (2) the status of the trunk line connected to communications server 150; and (3) the connection between the various servers connected to WAN 180. As described below, if any processes on communications server 150 or connection to the circuit switched network 130 is interrupted, system management unit 197 can allocate resources, or cause the re-routing of a call or message via one or more redundant resources or connections, ensuring that the call or message is routed to the final destination.

Communications server 150 contains user data needed to receive and route incoming messages received from circuit switched network 130. The same information is also stored on database server 195. In the preferred embodiment, communications server 150 stores an inbound address, a set of final destination addresses; and an account status for each user. The inbound address corresponds to the telephone number assigned to the user. As further discussed below, the inbound address is the number that a message sender dials on telephone unit 110 or facsimile unit 120 to leave a message for the user. The set of final destination address contain one or more e-mail addresses where the user account status information indicates whether the inbound address is either active and or inactive—i.e, whether the user is able to receive messages using the system.

Database server 195 stores a duplicate copy of the inbound address, the set of final destination addresses; and the account status for each user. Database server 195 also stores additional information for each user such as mailing address and billing information which are not used in the operation of the present invention but are note herein for completeness only. Thus, the information that is stored on communications server 150 is a subset of the information that is stored on database server 195, and if communications server 150 were to become inoperable or otherwise unable to handle incoming messages, database server 195 can configure another communications server to accept those calls.

In the preferred embodiment, system management unit 197 is responsible for monitoring the status of communications server 150 and re-assigning the users being handled by communications server 150 if communications server malfunctions or becomes overloaded with incoming calls. In the former case, system management unit 197 would re-assign all users being handled by communications server 150 to another communications server. In the latter case, system mananagment unit 197 would only off-load the only those incoming calls for which communications server 150 does not have the available resources to process.

Figure 2:
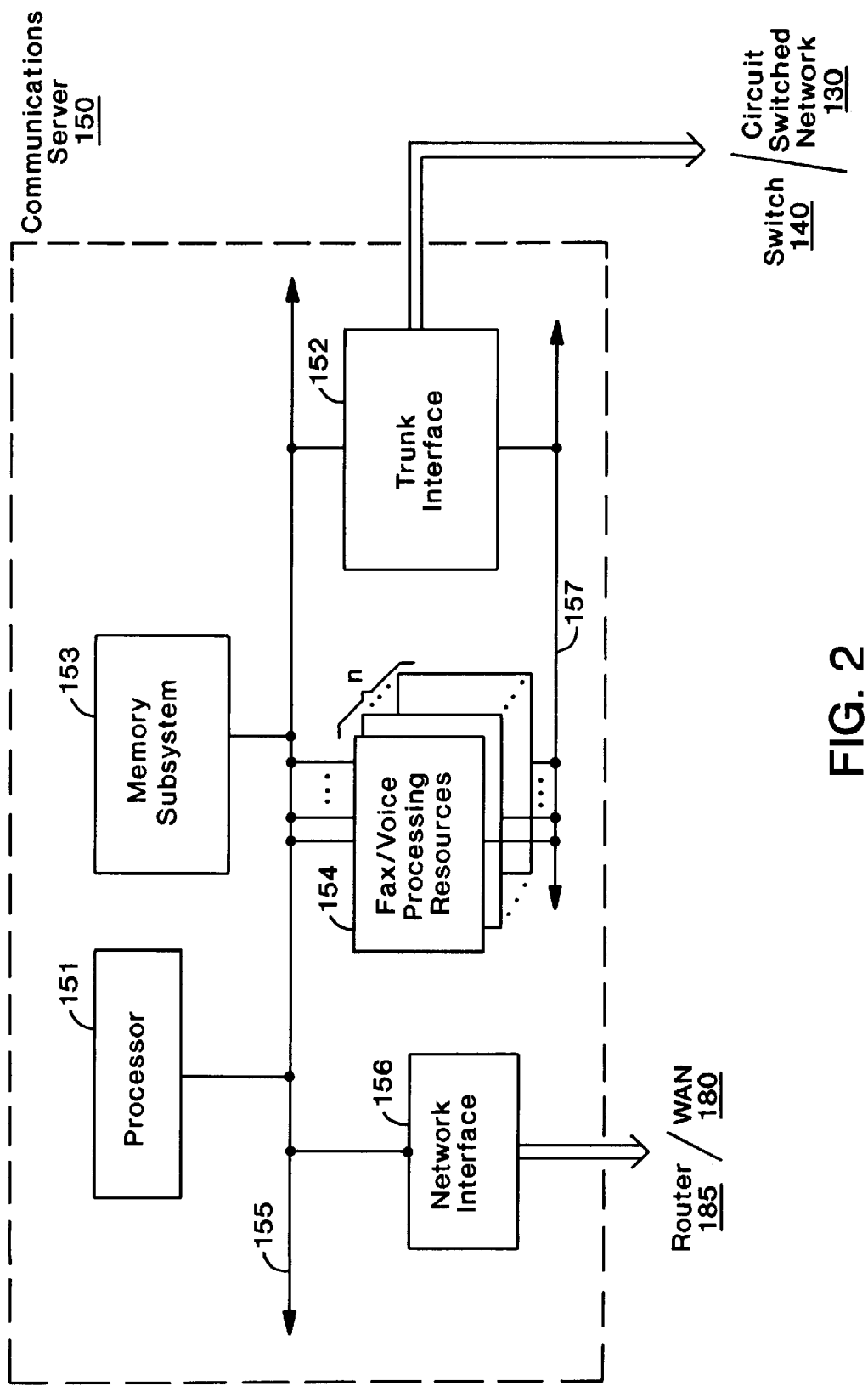
FIG. 2 is a block diagram illustrating the message server configured in accordance with the preferred embodiment of the present invention.

FIG. 2 is a block diagram of communications server 150 configured in accordance with the preferred embodiment of the present invention, containing a processor 151 coupled to a memory subsystem 153 through the use of a system bus 155. Also coupled to system bus 155 is a network interface 156; a trunk interface 152; and a set of fax/voice processing resources 154. Set of fax/voice processing resources 154 and trunk interface 152 are also coupled to a bus 157.

Bus 157 is a bus that supports time division multiplex access (TDMA) protocols to optimize the flow of real time traffic between set of fax/voice processing resources 154 and trunk interface 152.

Memory subsystem 153 is used to store information and programs needed by communications server 150. The functioning of memory subsystems in computer design are well known to those of ordinary skill in the art and thus will not be further discussed herein.

In the preferred embodiment, trunk interface 152 is a trunk line interface, such as a T-1 or E-1 line, to switch 140 and can handle up to 24 channels of communications. Trunk line signaling is well known to those of ordinary skill in the art of telecommunication and thus will not be further discussed herein except as necessary for describing the invention.

Set of fax/voice processing resources 154 are made up of multiple fax/voice processing cards. Each of these processing cards contain processing units which are capable of receiving and transmitting facsimiles according to established protocols, and which are capable of digitizing voice or other audio data, also according to established protocols. In the preferred embodiment, there are three fax/voice processing cards in set of fax/voice processing resources 154, each fax/voice processing card containing eight processing units capable of handling a channel from trunk interface 152. Thus, communications server 150 can communicate on twenty-four channels concurrently.

The storage of destination addresses on both circuit switched network 130 and WAN 180 is controlled by a database located either on communications server 150 or on database server 195. Keeping this information separate from communications server 150 allows communications server 150 to be a resource that can be allocated on demand. Hence, a number of communications servers could be used, along with one or more database servers, to allow a fully redundant and scalable system. In addition, system management unit 197 monitors the status and connection of all the communication and database servers.

Figure 3:
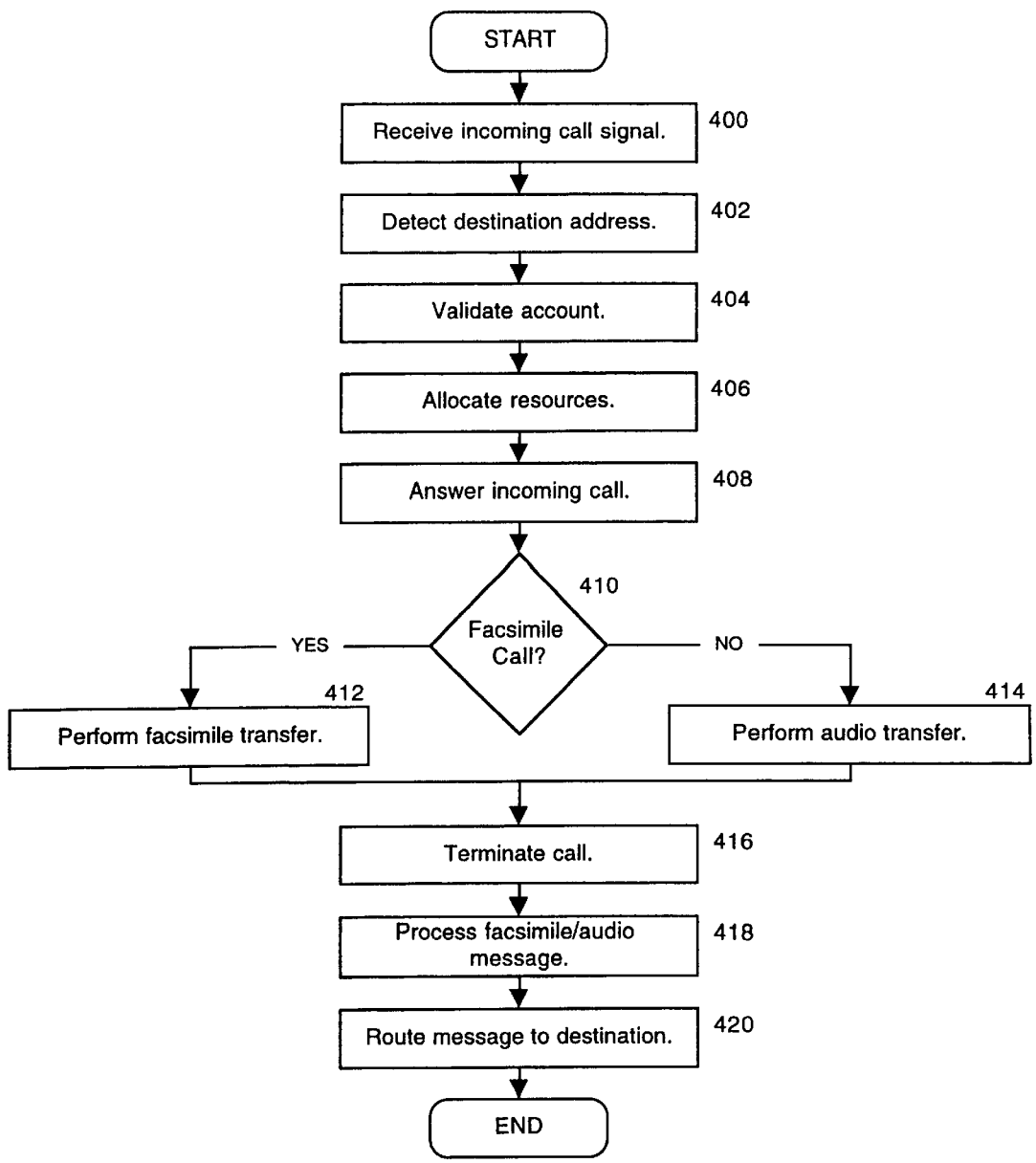
FIG. 3 is a flow diagram illustrating the operations of the preferred embodiment of the present invention.

FIG. 3 is a flow diagram illustrating the operations of the preferred embodiment of the present invention when a call originating from a source on the circuit switched network 130. For example, either telephone unit 110 or facsimile unit 120 can initiate the call.

In block 400, an incoming call signal is received by communications server 150 from switch 140. The incoming call signal is initiated by telephone unit 110 or facsimile unit 120 over circuit switched network 130 and is routed to communications server 150 via switch 140. Communications server 150 detects the incoming call signal using trunk interface 152. Operation would continue with block 402.

Continuing with block 402, trunk line interface unit 152, in addition to receives signals to indicate that there is an incoming call from switch 140, also receives signals indicating the circuit destination address of the incoming call. The destination address is captured by trunk interface 152 and is determined by trunk line signaling using mechanisms such as direct-inward-dial, or dual tone multifrequency (DTMF) tones.

Continuing with block 404, to determine whether or not to process the incoming call, processor 151 searches the list of inbound addresses contained in memory subsystem 153 for the destination address. If processor 151 finds the destination address in the inbound address list, processor 151 will then look up the account status for the user who owns the inbound address to determine if the account of that user is a valid user account. In an alternate embodiment, the validation is performed through the use of a database maintained by a separate entity such as database server 195. If the account is found to be inactive, communications server 151 will play a prepared message indicating that the number to which the incoming message was sent is an invalid account.

In block 406, once the validity of the user account has been established, processor 151 will attempt to allocate one fax/voice processing resource from set of fax/voice processing resources 154 and also determine the availability of other resources required for the receipt and processing of the incoming call. These other resources include the processing capacity of processor 151, the storage capacity of memory subsystem 153.

If it is determined that the appropriate resources are not available, then the call will be routed to a different communications server that is capable of allocating the necessary resources. The routing of calls is accomplished by trunk line signaling via switch 140 and is managed by system management unit 197.

Also, it should be noted that the call will only come from switch 140 to communications server 150 if there are no problems with the line. Otherwise the call will get routed to a different communications server. In the preferred embodiment, fault detection and correction happens in one of two ways. First, on the telephone network side, switch 140 can be set up to independently route a call to another line if it is determined that one of the lines is bad. Second, if communications server 150 detect that the trunk line coming into trunk interface 152 is down, communications server 150 will notify system management unit 197 to reallocate the users for whom communications server 150 is responsible onto another communications server. Thus, system management unit 197 will transfer the duplicate user information contained in database server 195 into a different communications server.

In block 408, communications server 150 "answers" the incoming call by having trunk interface 152 go "off-hook" on the trunk line.

In block 410, if the fax/voice processing resource of set of fax/voice processing resources 154 which is processing the call determines that the incoming call is a fax transmission, then operation will continue with block 412. Otherwise, operation will continue with block 414. For example, if the call is a fax, a fax protocol is initiated, and the fax is received by one of the fax/voice processing resources of set of fax/voice processing resources 154. If the call is a voice call, the voice is recorded by one of the fax/voice processing resources of set of fax/voice processing resources 154.

In block 412, the fax/voice processing resource of set fax/voice processing resources 154 responsible for processing the incoming call will perform the fax transfer and store the incoming message as a temporary file in memory subsystem 153. In the preferred embodiment, the incoming fax is saved into a file which follows the group 3 facsimile file format. Operation will then continue with block 416.

In block 414, where it is determined that the incoming message is an audio message, the fax/voice processing resource of set of fax/voice processing resources 154 allocated to process the call will initiate an audio recording of the incoming voice message. In the preferred embodiment, the audio message is digitized and stored in memory subsystem 153 as a temporary file in a pulse code modulated format. After the incoming call has been digitized and stored, operation will then continue with block 416.

In block 416, trunk interface 152 will terminate the call. Operation will then continue with block 418.

In block 418, the incoming message, which has been stored as a temporary file in memory subsystem 153, is processed by processor 151. In the preferred embodiment, the temporary file is processed according to the type of the incoming call. If the incoming call was a fax transmission, then the temporary file, which has been stored as a group 3 facsimile file, will be converted into a file which follows the tagged image file format (TIFF), or a format that is suitable for transmission over WAN 180. Optionally, the temporary fax file can also be compressed at this stage. If the incoming call was an audio message, then the temporary file would be compressed using a compression scheme such as the scheme defined in the global system for mobile-communications (GSM) standard. In alternate operations, compressing and other processing of the incoming message is performed as the same time the incoming message is being received and being placed in memory subsystem 153.

In block 420, communications server 150 uses the inbound address to determine the set of final destination addresses, which are destinations on WAN 180 (i.e., the packet switched network), to send the processed incoming message. Communications server 150 then sends an electronic mail (e-mail) with the processed incoming message as an attachment to all the destinations in the set of final destination addresses.

For example, the e-mail containing the attachment is transferred to, and stored in, a server such as mail server 160, The e-mail is then retrieved by client 190 whenever the user wishes. In an alternate embodiment, client 190 can retrieve the e-mail directly from communications server 150, without the storing operation of mail server 160.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A system comprising:

a set of switches coupled to a circuit switched network for receiving a set of incoming call signals, wherein the incoming call signal includes an inbound address, and wherein a switch in the set of switches redirects an incoming can signal from a first communications server to a second communications server if a first condition occurs; and, a set of communications servers coupled to the set of switches for receiving the set of incoming call signals, each communications server being coupled to a network and containing a message processing resource configured to process a received audio message into a digital representation, wherein each communications server further comprises a trunk line interface to extract the inbound address and stores the inbound address, a set of final destination addresses and account status, and the message processing resource is further configured to determine, based on the inbound address, a user account and a destination on a packet switched network and send the digital representation to the destination, wherein the inbound address is assigned to the user account and the outbound address comprises at least one email address.

2. The system of claim 1, where the first condition occurs if the first communications server sends a rejection signal to the switch.

3. The system of claim 1, where the first condition occurs if the first communications server is unable to process the incoming call signal.

4. The system of claim 1, where the incoming call signal signals an incoming call and the first condition occurs if the first communications server is unable to process the incoming call.

5. The system of claim 1, further comprising a system management unit for setting the first condition.

6. The system of claim 1, further comprising a system management unit, and the first condition occurs if the system management unit determines that the second communications server should receive the incoming call signal.

7. The system of claim 1, where the set of switches includes a second switch, and the first communications server is coupled to the switch and the second communications server is coupled to the second switch.

8. The system of claim 7, where the switch redirects the incoming call signal to the second switch.

9. The system of claim 1, where the inbound address is a circuit destination address.

10. The system of claim 1, where the message processing resource is further configured to validate the inbound address.

11. The system of claim 1, where the audio message is a facsimile message and the digital representation of the audio message is a graphics file.

12. The system of claim 1, where the message processing resource further comprises a processor to:

determine if the audio message contains a facsimile message or a voice message; and, digitize the audio message if the audio message contains the voice message and receive the facsimile message if the audio message contains the facsimile message.

13. A method comprising:

receiving a first incoming call signal destined for a first communications server for processing of an audio message into a digital representation;

determining if a first condition has occurred;

redirecting the first incoming call signal from the first communications server to a second communications server based on the determining of the first condition, wherein the incoming call signal includes an inbound address;

extracting the inbound address;

determining, based on the inbound address, a user account status and a destination on a packet switched network; and, sending the digital representation to the destination, wherein the inbound address is assigned to the user account and the destination comprises at least one email address.

14. The method of claim 13, where determining the first condition includes determining that the first communications server sends a rejection signal.

15. The method of claim 13, where determining the first condition includes determining that the first communications server is unable to process the incoming call signal.

16. The method of claim 13, where the incoming call signal signals an incoming call and determining the first condition includes determining that the first communications server is unable to process the incoming call.

17. The method of claim 13, where determining the first condition includes determining that a system management unit selects the second communications server for receiving the incoming call signal.

18. The method of claim 13, where redirecting the first incoming call signal includes using a switch to redirect the first incoming signal from the first communication server to the second communication server.

19. The method of claim 13, where the inbound address is a circuit destination address.

20. The method of claim 13, further including validating the inbound address.

21. The method of claim 13, where the audio message is a facsimile message and the digital representation of the audio message is a graphics file.

22. The method of claim 13, further including:

determining if the audio message contains a facsimile message or a voice message; and, digitizing the audio message if the audio message contains the voice message and receiving the facsimile message if the audio message contains the facsimile message.

* * * * *

UNITED STATES PATENT AND TRADEMARK OFFICE
CERTIFICATE OF CORRECTION

PATENT NO. : 6,208,638 B1
DATED : March 27, 2001
INVENTOR(S) : Rieley et al.

It is certified that error appears in the above-identified patent and that said Letters Patent is hereby corrected as shown below:

Claim 1,
Line 6, please delete "can" and insert -- call --.

Signed and Sealed this

Twelfth Day of March, 2002

*Attest:*

*Attesting Officer*

JAMES E. ROGAN
*Director of the United States Patent and Trademark Office*

(12) EX PARTE REEXAMINATION CERTIFICATE (6563rd)
United States Patent
Rieley et al.

(10) Number: US 6,208,638 C1
(45) Certificate Issued: Dec. 9, 2008

(54) METHOD AND APPARATUS FOR TRANSMISSION AND RETRIEVAL OF FACSIMILE AND AUDIO MESSAGES OVER A CIRCUIT OR PACKET SWITCHED NETWORK

(75) Inventors: Jack Rieley, New York, NY (US); Jaye Muller, New York, NY (US)

(73) Assignee: J2 Global Communications, Inc., Hollywood, CA (US)

Reexamination Request:
No. 90/007,796, Nov. 7, 2005

Reexamination Certificate for:
Patent No.: 6,208,638
Issued: Mar. 27, 2001
Appl. No.: 08/829,857
Filed: Apr. 1, 1997

Certificate of Correction issued Mar. 12, 2002.

(51) Int. Cl.
| | |
|---|---|
| H04N 1/00 | (2006.01) |
| H04M 7/00 | (2006.01) |
| H04M 7/12 | (2006.01) |
| H04M 3/53 | (2006.01) |
| H04M 3/50 | (2006.01) |

(52) U.S. Cl. ............... 370/354; 370/401; 379/88.17; 379/100.08; 379/221; 709/227

(58) Field of Classification Search ............ None
See application file for complete search history.

(56) References Cited

U.S. PATENT DOCUMENTS

| | | | |
|---|---|---|---|
| 4,106,060 A | 8/1978 | Chapman, Jr. | |
| 4,289,930 A | 9/1981 | Connolly et al. | |
| 4,405,829 A | 9/1983 | Rivest et al. | |
| 4,532,588 A | 7/1985 | Foster | |
| 4,713,780 A | 12/1987 | Schultz et al. | |
| 4,754,428 A | 6/1988 | Schultz et al. | |
| 4,816,653 A | 3/1989 | Anderl et al. | |
| 4,837,798 A | 6/1989 | Cohen et al. | |
| 4,853,961 A | 8/1989 | Pastor | |
| 4,918,722 A | 4/1990 | Duebren et al. | |
| 4,941,170 A | 7/1990 | Herbst | |
| 5,008,814 A | 4/1991 | Mathur | |
| 5,033,079 A | 7/1991 | Catron et al. | |
| 5,065,427 A | 11/1991 | Godhole | |
| 5,068,888 A | 11/1991 | Scherk et al. | |
| 5,091,790 A | 2/1992 | Silverberg | |
| 5,105,184 A | 4/1992 | Pirani et al. | |
| 5,113,430 A | 5/1992 | Richardson, Jr. et al. | |
| 5,113,496 A | 5/1992 | McCalley et al. | |
| 5,115,326 A | 5/1992 | Burgess et al. | |
| 5,127,003 A | 6/1992 | Doll, Jr. et al. | |
| 5,167,011 A | 11/1992 | Priest | |
| 5,175,762 A | 12/1992 | Kochis et al. | |
| 5,193,110 A | 3/1993 | Jones et al. | |

(Continued)

FOREIGN PATENT DOCUMENTS

| | | |
|---|---|---|
| DE | 4309072 | 9/1994 |
| EP | 0554456 A1 | 8/1993 |
| EP | 0615368 | 9/1994 |

(Continued)

OTHER PUBLICATIONS

Broadhead, S., "Getting Your Fax Straight: Getting Agead of the Game With Fax Server Technology", Network Computing, Feb. 1998, pp. 46–8, 50, vol. 6, No. 2, Business and Technical Communications, UK.

(Continued)

Primary Examiner—Roland G Foster

(57) ABSTRACT

A method and apparatus for accepting an incoming message over a circuit switched network and transmitting it over a packet switched network. The apparatus including means for implementing the steps of receiving an incoming call signal along with a inbound address; determining a user account and a final address on said packet switched network associated with said inbound address; allocating a message processing resource; processing said incoming call into a processed message; and, sending said processed message to said final address.

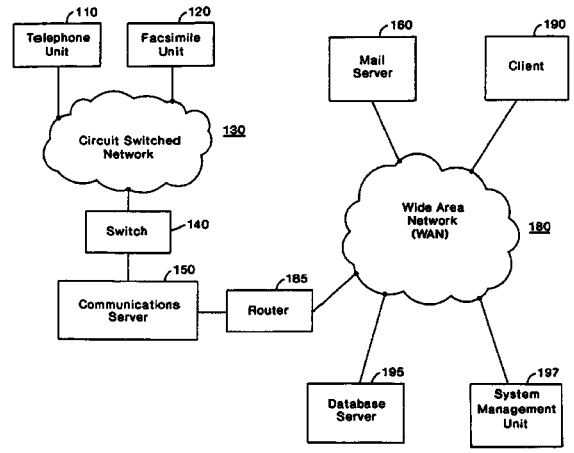

U.S. PATENT DOCUMENTS

| | | |
|---|---|---|
| 5,195,085 A | 3/1993 | Bertsch et al. |
| 5,224,156 A | 6/1993 | Fuller et al. |
| 5,241,594 A | 8/1993 | Kung |
| 5,247,591 A | 9/1993 | Baran |
| 5,247,661 A | 9/1993 | Hager et al. |
| 5,255,312 A | 10/1993 | Koshishi |
| 5,257,112 A | 10/1993 | Okada |
| 5,274,635 A | 12/1993 | Rahman et al. |
| 5,276,869 A | 1/1994 | Forrest et al. |
| 5,283,887 A | 2/1994 | Zachery |
| 5,289,472 A | 2/1994 | Cho |
| 5,291,302 A | 3/1994 | Gordon et al. |
| 5,291,546 A | 3/1994 | Giler et al. |
| 5,293,250 A | 3/1994 | Okamura et al. |
| 5,297,208 A | 3/1994 | Schlafly et al. |
| 5,299,255 A | 3/1994 | Iwaki et al. |
| 5,317,628 A | 5/1994 | Misholi et al. |
| 5,333,266 A | 7/1994 | Boaz et al. |
| 5,339,156 A | 8/1994 | Ishii |
| 5,349,636 A | 9/1994 | Irribarren |
| 5,351,276 A | 9/1994 | Doll, Jr. et al. |
| 5,355,472 A | 10/1994 | Lewis |
| 5,367,621 A | 11/1994 | Cohen et al. |
| 5,379,374 A | 1/1995 | Ishizaki et al. |
| 5,394,460 A | 2/1995 | Olson et al. |
| 5,404,231 A | 4/1995 | Bloomfield |
| 5,406,557 A | 4/1995 | Baudoin |
| 5,418,908 A | 5/1995 | Keller et al. |
| 5,424,724 A | 6/1995 | Williams et al. |
| 5,459,584 A | 10/1995 | Gordon et al. |
| 5,471,617 A | 11/1995 | Farrand et al. |
| 5,475,738 A | 12/1995 | Penzias |
| 5,479,411 A | 12/1995 | Klein |
| 5,479,491 A | 12/1995 | Herrero Garcia et al. |
| 5,483,466 A | 1/1996 | Kawahara et al. |
| 5,483,524 A | 1/1996 | Lev et al. |
| 5,483,580 A | 1/1996 | Brandman et al. |
| 5,495,610 A | 2/1996 | Shing et al. |
| 5,497,373 A | 3/1996 | Hulen et al. |
| 5,509,123 A | 4/1996 | Dobbins et al. |
| 5,513,323 A | 4/1996 | Williams et al. |
| 5,524,137 A | 6/1996 | Rhee |
| 5,526,353 A | 6/1996 | Henley et al. |
| 5,530,740 A | 6/1996 | Irribarren et al. |
| 5,530,852 A | 6/1996 | Meske, Jr. et al. |
| 5,542,289 A | 8/1996 | Sharma |
| 5,544,320 A | 8/1996 | Konrad |
| 5,555,100 A | 9/1996 | Bloomfield et al. |
| 5,557,659 A | 9/1996 | Hyde-Thompson |
| 5,559,611 A | 9/1996 | Bloomfield et al. |
| 5,568,540 A | 10/1996 | Greco et al. |
| 5,572,643 A | 11/1996 | Judson |
| 5,590,178 A | 12/1996 | Murakami et al. |
| 5,604,788 A | 2/1997 | Tett |
| 5,608,786 A | 3/1997 | Gordon |
| 5,621,727 A | 4/1997 | Vaudreuil |
| 5,625,675 A | 4/1997 | Katsumaru et al. |
| 5,630,060 A | 5/1997 | Tang et al. |
| 5,630,061 A | 5/1997 | Richter et al. |
| 5,633,916 A | 5/1997 | Goldhagen et al. |
| 5,634,005 A | 5/1997 | Matsuo |
| 5,647,002 A | 7/1997 | Brunson |
| 5,654,957 A | 8/1997 | Koyama |
| 5,673,316 A | 9/1997 | Auerbach et al. |
| 5,675,507 A | 10/1997 | Bobo, II |
| 5,677,955 A | 10/1997 | Doggett et al. |
| 5,687,220 A | 11/1997 | Finnigan |
| 5,689,550 A | 11/1997 | Garson et al. |
| 5,692,039 A | 11/1997 | Brankley et al. |
| 5,694,458 A | 12/1997 | Okada |
| 5,710,883 A | 1/1998 | Hong et al. |
| 5,712,901 A | 1/1998 | Meermans |
| 5,712,903 A | 1/1998 | Bartholomew et al. |
| 5,717,742 A | 2/1998 | Hyde-Thompson |
| 5,724,410 A | 3/1998 | Parvulescu et al. |
| 5,727,156 A | 3/1998 | Herr-Hoyman et al. |
| 5,737,395 A | 4/1998 | Irribarren |
| 5,737,396 A | 4/1998 | Garcia |
| 5,742,596 A | 4/1998 | Baratz et al. |
| 5,751,791 A | 5/1998 | Chen et al. |
| 5,751,814 A | 5/1998 | Kafri |
| 5,751,956 A | 5/1998 | Kirsch |
| 5,768,528 A | 6/1998 | Stumm |
| 5,774,668 A | 6/1998 | Choquier et al. |
| 5,781,614 A | 7/1998 | Brunson |
| 5,781,901 A | 7/1998 | Kuzma |
| 5,787,175 A | 7/1998 | Carter |
| 5,790,790 A | 8/1998 | Smith et al. |
| 5,790,793 A | 8/1998 | Higley |
| 5,793,972 A | 8/1998 | Shane |
| 5,805,298 A | 9/1998 | Ho et al. |
| 5,812,639 A | 9/1998 | Bartholomew et al. |
| 5,819,295 A | 10/1998 | Nakagawa et al. |
| 5,870,549 A | 2/1999 | Bobo, II |
| 5,872,845 A | 2/1999 | Feder |
| 5,872,926 A | 2/1999 | Levac et al. |
| 5,893,908 A | 4/1999 | Cullen et al. |
| 5,903,723 A | 5/1999 | Beck et al. |
| 5,911,776 A | 6/1999 | Guck |
| 5,930,493 A | 7/1999 | Ottessen et al. |
| 5,933,412 A | 8/1999 | Choudhury et al. |
| 5,933,490 A | 8/1999 | White et al. |
| 5,937,161 A | 8/1999 | Mulligan et al. |
| 5,940,476 A | 8/1999 | Morganstein et al. |
| 5,946,386 A | 8/1999 | Rogers et al. |
| 5,960,085 A | 9/1999 | de la Huerga |
| 5,963,618 A | 10/1999 | Porter |
| 5,987,508 A | 11/1999 | Agraharam et al. |
| 5,991,292 A | 11/1999 | Focsaneanu et al. |
| 5,996,006 A | 11/1999 | Speicher |
| 5,999,594 A | 12/1999 | Mizoguchi et al. |
| 6,009,173 A | 12/1999 | Sumner |
| 6,009,469 A | 12/1999 | Mattaway et al. |
| 6,020,980 A | 2/2000 | Freeman |
| 6,023,345 A | 2/2000 | Bloomfield |
| 6,025,931 A | 2/2000 | Bloomfield |
| 6,028,679 A | 2/2000 | Murphy |
| 6,032,192 A | 2/2000 | Wegner et al. |
| 6,035,332 A | 3/2000 | Ingrassia, Jr. et al. |
| 6,052,367 A | 4/2000 | Bowater et al. |
| 6,052,442 A | 4/2000 | Cooper et al. |
| 6,055,530 A | 4/2000 | Sato |
| 6,061,448 A | 5/2000 | Smith et al. |
| 6,064,723 A | 5/2000 | Cohn et al. |
| 6,069,890 A | 5/2000 | White et al. |
| 6,072,862 A | 6/2000 | Srinivasan |
| 6,084,892 A | 7/2000 | Benash et al. |
| 6,084,952 A | 7/2000 | Beerman, Jr. et al. |
| 6,108,329 A | 8/2000 | Oyama et al. |
| 6,181,781 B1 | 1/2001 | Porter |
| 6,192,407 B1 | 2/2001 | Smith et al. |
| 6,212,550 B1 | 4/2001 | Segur |
| 6,215,550 B1 | 4/2001 | Baer et al. |
| 6,229,884 B1 | 5/2001 | Toyoda et al. |
| 6,233,318 B1 | 5/2001 | Picard et al. |
| 6,240,454 B1 | 5/2001 | Nepustil |
| 6,259,533 B1 | 7/2001 | Toyoda et al. |
| 6,282,270 B1 | 8/2001 | Porter |
| 6,285,777 B2 | 9/2001 | Kanevsky et al. |
| 6,295,552 B1 | 9/2001 | Shibata |
| 6,301,245 B1 | 10/2001 | Luzeski et al. |

| | | | |
|---|---|---|---|
| 6,301,339 B1 | 10/2001 | Staples et al. | |
| 6,304,636 B1 | 10/2001 | Goldberg et al. | |
| 6,330,323 B1 * | 12/2001 | Gottlieb et al. | 379/220.1 |
| 6,360,256 B1 | 3/2002 | Lim | |
| 6,411,696 B1 | 6/2002 | Iverson et al. | |

FOREIGN PATENT DOCUMENTS

| | | |
|---|---|---|
| EP | 0835021 A1 | 4/1998 |
| JP | 2237338 | 9/1990 |
| JP | 4018844 | 1/1992 |
| JP | 4111557 | 4/1992 |
| JP | 4150351 | 5/1992 |
| JP | 4265040 | 9/1992 |
| JP | 5244292 | 9/1993 |
| JP | 6164645 | 6/1994 |
| JP | 7023057 | 1/1995 |
| JP | 7058845 | 3/1995 |
| JP | 7288668 | 10/1995 |
| JP | 8111692 | 4/1996 |
| JP | 8130601 | 5/1996 |
| JP | 8237294 | 9/1996 |
| JP | 8237297 | 9/1996 |
| JP | 8256235 | 10/1996 |
| JP | 8286991 | 11/1996 |
| JP | 8336053 | 12/1996 |
| JP | 7170288 | 1/1997 |
| JP | 9046369 | 2/1997 |
| JP | 9102798 | 4/1997 |
| JP | 9200251 | 7/1997 |
| WO | WO 95/31060 | 11/1995 |
| WO | WO 96/27160 | 9/1996 |
| WO | WO 96/27967 | 9/1996 |
| WO | WO 96/34341 | 10/1996 |
| WO | WO 97/23082 A1 | 6/1997 |
| WO | WO 98/17041 A2 | 4/1998 |
| WO | WO 98/23058 A2 | 5/1998 |

OTHER PUBLICATIONS

SHAREWARE.COM., "Search Results", Dec. 5, 1996, <http://www.search.shareware.com/code/...mail+fax+&category=All–Categories>.

JFAX Personal Telecom, "Get All Your Voice–Mail and Faxes in Your E–Mail", Dec. 4, 1996, <http://www.jfax.net/>.

JFAX Personal Telecom, "Free Downloads JFAX Communicator Software!", Dec. 4, 1996, <http://www.jfax.net/software.htm/>.

JFAX Personal Telecom, "What the Media Says About JFAX Personal Telecom", Oct. 31, 1996, <http://www.jfax.net/>.

Yahoo, Inc., "NetScan Kofax", Yahoo! Internet Life, Jan. 1997, p. 73, vol. 3, No. 1., ttp://www.yil.com/>.

Netscan, Kofax, "The Easy Way to Share A Scanner", Dec. 13, 1996, <http://www.netscan.kofax.com/>.

Sheng, Guo Zhen, et al., "Intranet–Based Mail Fax Gateway Technology", 1997 IEEE International Conference on Intelligent Processing Systems, Oct. 28–31, 97TH8335 vol. 2 of 2, pp. 1607–1611, Beijing, China.

Public–Key Cryptography Standards (PKCS), An RSA Laboratories Technical Note, Revised Nov. 1, 1993, downloaded from the Internet at www.ftp.rsa.com, on Oct. 1, 1998.

Nakamura, D., "AT&T Introduces Most Comprehensive Fax–to–Data Service" dated Feb. 22, 1996, downloaded from Internet at http://www.att.com/press/0296/960222.ela.html on May 16, 1997.

"Bibliography of Publications on the Andrew User Interface System," downloaded from the internet at ftp.andrew.cm-u.edu/pub/AUIS/PAPERS/BIBLIOGRAPHY, on May 13, 2002.

"Biscom Introduces the Efax Machine: the E–mail/Facsimile Solution for the Rest of Us," FAXCOM, Sep. 19, 1996.

"C3 Launches its Advanced ITmail Multi–media Messaging System for Desk Top PC's," Computer and Communications Company Ltd., Jun. 1993.

Rivest, R. "Chaffing and Winnowing: Confidentiality without Encryption," downloaded from the Internet at www,theory.lcs.mit.edu, on Jul. 13, 1999.

Ohio State University, C.S.E., "comp.mail.mime meta–FAQ: Help for MIME problems," downloaded from the Internet at www.cis.ohio–state.edu/text/faq/usenet/mail/mimefaq/partl/faq.html, Jun. 11, 1997.

"comp.mail.mime frequently asked questions list (FAQ) (1/3)," downloaded from the Internet at www.tu–chem–nitz.del–fri/mime/FAQ–I.HTMK, Sep. 4, 1994.

"Composing and Sending MIME Message," downloaded from the Internet at www.gieldasgarage.com/mh/cosemime.htm on Apr. 2, 1999.

"Cryptography Systems," downloaded from the Internet at www.elock.com.

"Digital Note Fax2Net R5S 1—A Beginners Guide to Digital Mail Fax," Digital Mail Limited, Oct. 31, 1996.

Facts on File re Andrew: downloaded from the Internet at www.cs.cmu.edu:80/afs/cs.cmu.edu/project/atk–fip/web/fax–onfile.html.

"Hotmail Introduces hotmail WebCourier Direct Content Delivery Service," Business Wire, pp. 020330123, Mar. 1997.

"How does the S/MIME encryption and digital signature process work?" downloaded from the Internet at www.worldtalk.com, on Jul. 25, 1999.

"How Posta Works," downloaded from the Internet at www.tumbleweed.com/posta/posta.overview.html on Aug. 11, 2005.

J. Duffy, "IBM's SAA Gets Voice: Company to Expand Enterprise Networking Horizons," Computer Systems News, p. 1, May 14, 1990.

"Information Technology—Text and Office Systems—Distributed Office Applications Model: Part 2; Distinguished–object–reference and Associated Procedures," International Standard ISO/IEC 10031–2:1–13, 1991.

"Information Technology—Text and office systems—Distributed–office–applications model—Part 1: General model," International Standard ISO/IEC 10031–1:1–73, 1991 (E).

"Ipswitch Delivers the First Internet–Ready Messaging Server for Windows NT that Allows Access to E–Mail via the Web,"PR Newswire, pp. 1209NEM007 Dec. 9, 1996.

"Frequently Asked Questions", JFax Personal Telecom, downloaded from Internet at www.jfax.net./faq.htm on Oct. 31, 1996.

N. Ballard, "@ The Paperless Office", JFax Personal Telecom, downloaded from the Internet at wwwjfax.net/ballard1.htm on Oct. 31, 1996.

"JFax Personal Telecom—Plug a Phone Into Your E–Mail," downloaded from Internet at www.jfax.com on Oct. 31, 1996.

"Keys and Certificates," downloaded from the Internet at www.elock.com, 1998.

"Lan–Aces, Inc. Announces Expanded Capabilities to Office–Logic Clerk Application," PR Newswire, May–Jun. 1994.

J. Lyle, "Internet Fax Software: Internet Fax Utility Offers Simplified Faxing to E–Mail Addresses", Lumina News, Sep. 3, 1996, downloaded from Internet at http://www.lumina2000.com/lumina/press93.html printed on Jun. 11, 1997.

"Delivering Unified Messaging Solutions on the Internet", Media Mail, Nov. 2, 1996, downloaded from Internet at www.web.archive.org/web/1996121905113/http://222/medialmail.com on Mar. 2, 2005.

"Metholody for Mail Delivery in a Multi–Media Environment," IBM Technical Disclosure Bulletin, Apr. 1993, pp. 507–508.

"Microsoft Messaging Application Pro Interface (MAPI)," downloaded from the Internet at www.mmicrosof–com/win32dev/apiext/mapiwp.html on Mar. 22, 1999.

"New Features in Mosaic 2.0," Internet Publication, downloaded from http://www.Issl.com. Dec. 1994.

"Overview of the Trans–Virtual Enterpriser Server," Product Overview.

"Reading MIME Messages," downloaded from the Internet at www.gieldasgarage.com/mh/cosemime.htm on Apr. 2, 1999.

"S/MIME Frequently Asked Questions," downloaded from the Internet at www/rsa.com, on Jul. 23, 1999.

"S/MIME Frequently Asked Questions," downloaded from the Internet at www.rsa.com, on Nov. 16, 1999.

"S/MIME Or Open PGP? How Will You Secure Your E–mail?" downloaded from the Internet at www.worldtalk.com, 1998.

"ScanFX–Scanning Hardware for Internet E–Mail," Our Business Machines, Inc., OBM's Editorial Resource Chest, Aug. 1996, Irwindale, CA.

J. Kravitz, "SDML–Signed Document Markup Language," Financial Services Technology Consortium, W3C Note Jun. 19, 1998, downloaded from the Internet at www.23.org, on Jun. 19, 1998.

"The Andrew Messages System," downloaded from the Internet at www.cs.cmu.edu/afs/cs.cmu.edu/project/atk–ftpl/web/ams.html on May 12, 1999.

"The Andrew Publication Archive," downloaded from the internet at ftp.andrew.cmu.edu/pub/AUIS/PAPERS/REDME on May 13, 2002.

"Three Pronged Strategy for Octel, as it Integrates VMX and Moves from Core Market to New Territories," Computergram International, Aug. 1995, n.2719, ComputerWire, Inc.

"Web Mail," Information Week, p. 120, Dec. 16, 1996.

"Welcome to the Andrew Consortium," downloaded from the internet at www.cs.cmu.edu:80/afs/cs.cmu.edu/project/atk–ftp/web/andrew–home–html on May 12, 1999.

"Working with AT&T Easylink, An Effective Communication Solution for Business," PC Today 62, May 1995.

"Word Wide Web Frequently Asked Questions," from URL http://sunsite.unc.edu/boutell/faq/www.faq.html, Dec. 9, 1994.

A. Poggio et al., "CCWS: A Computer–Based, Multimedia Information System," Multimedia Communications, pp. 92–103, Oct. 1985.

A. Reinhardt, "Smarter E–Mail Is Coming," BYTE Magazine, pp. 90–108, Mar. 1993.

A. N. Boston et al., "Interactive species distribution reporting, mapping, and modeling using the World Wide Web," Computer Networks and ISDN Systems, 28, pp. 231–238, 1995.

A. Singleton, "The Virtual Storefront," BYTE Magazine, Jan. 1995.

B. Costales, et al., "sendmail," O'Reilly & Associates, Inc., Sebastopol, CA, 1993.

B. Friesenhahn, "Build Your Own WWW Server," BYTE Magazine, Apr. 1995.

B. S. Kaliski Jr., "An Overview of the PKCS Standards," RSA Laboratories Technical Note, RSA Security, Inc. Public–Key Cryptography Standards (PKCS), Revised Nov. 1, 1993.

B. Smith, "Internet with Style," BYTE Magazine, Jan. 1995.

B. Smith, "Making the Internet Connection," BYTE Magazine, Jan. 1995.

B. Wiegel, "Secure External References in Multimedia Email Message," $3^{rd}$ ACM Conference on Computer and Communications Security, New Delhi, India, Mar. 14–16, 1996.

Borenstein, Nathaniel S., "Internet Multimedia Mail with MIME: Emerging Standards for Interoperability," Upper Layer Protocols, Architectures and Applications, 1992, pp. 183–192. Elsevier Science Publishers B.V. (North–Holland).

C. Ellison, et al., "Default Protecting Secret Keys with Personal Entropy," Mar. 3, 1999.

C. Liu, et al., "Managing Internet Information Services," World Wide Web, Gopher, FTP, and more: 357–359, Dec. 1994.

C. Manros, "New Internet Mail Functionality for Delivery Status Notifications," Messaging Magazine, Jul./Aug. 1995.

C. R. Baudoin, "The Sematech Electronic Mail System," Proceedings of the Digital Equipment Computer Users Society, pp. 221–231, USA, Spring 1989.

D. Rush, "Announce: Voice Mail, Email & Fax Integration Over the Web," Google Groups: biz next newprod, Mar. 19, 1996, http://groups–beta.google.com/group/biznextnewprod/mso/db3c129fdo394667?dmode=source, Mar. 2, 2005.

D. Rush, "Voice Mail Email & Fax Integration Over the Web," Google Groups: biz next newprod, Mar. 25, 1996, http://groups–beta.google.com/group/biznextnewprod/mso/d85b59d49e92318b?dmode=source, Mar. 2, 2005.

E. Spire, 'Fax→E–mail' Google Groups, http://groups–beta.google.com/group/comp.acom.telecom,Dec. 20, 1995.

K. Moore, "MIME (Multipurpose Internet Mail Extensions) Part Two: Message Header Extensions for Non–ASCII Text," Network Working Group, RFC 1522, Sep. 1993.

MHonArc Home Page updated Nov. 17, 1994 and MHonArc software manual published by Earl Hood ehood@convex.com Convex Computer Corporation, Richardson Texas.

R. Schockey, "Fax→E–mail Plus Voice Mail Also?" Google Groups, http://groups–beta.google.com/group/comp.doom.telecom, Dec. 28, 1995.

R. Schockey, "Fax→E–mail Plus Voice Mail Also?" Google Groups, http://groups–beta.google.com/group/comp.doom.telecom/msg/7cb6ab0035e113c2?dmode=source, Dec. 28, 1995.

R. Schockey, "Fax→E–mail→Voice Continued," Google Groups, http://groups–beta.google.com/group/comp.doom.telecom/msg/1a2c73a37bc90e6b?dmode=source, Jan. 9, 1996.

S. Sreenivasan "Cybertimes German Pop Singer Sets Sights on Virtual Office," Sep. 23, 1996, downloaded from The New York Times CyberTime website.

Cope, "Working with . . . Fax Mailbox," *PCToday*, vol. 8, Issue 9, Sep. 1994.

D. H. Crocker, "Standard for the Format of ARPA Internet Text Message," RFC 822, 1982.

D. W. Connolly, "A Formalism for Internet Information References," downloaded from the Internet at www.w3.org/People/Connolly/drafts/formalism.txt on Feb. 8, 1995.

D. P. Dern, "Applying the Internet," BYTE Magazine, Feb. 1992.

Delrina Advertisement, 1994.

E. Levinson, "Exchanging SGML Documents Using Internet Mail and MIME," Computer Standards & Interfaces, 18, pp. 93–102, 1996.

E. Meyer, et al., "Borealis Image Server," Computer Networks and ISDN Systems, 28 pp. 1123–1137, 1996.

H. Pusch, "Design and implementation of a global reference mechanism for data objects," Computer Standards & Interfaces, 17, pp. 181–192, 1995.

Internet Engineering Task Force, R. Braden (ed.), "Requirements for Internet Hosts–Application and Support," Network Working Group, RFC 1123, Oct. 1989.

J. Davis, et al., "Drop in Publishing With the World Wide Web," Computer Networks and IDSN Systems, 28 pp. 247–255, 1995.

J. December, et al., "The World Wide Wide; Everything You Need to Master the Web!": 180–189–part 1 and 277–280 (part II), 1994.

J. Donahue, et al., "Walnut: Storing Electronic Mail in a Database," Xerox Park, CSL–85–9, Nov. 1985.

J. K. Reynolds, et al., "The DARPA Experimental Multimedia Mail System," Computer: 92–89, 1985.

J. Klensin, "Simple Mail Transfer Protocol," Internet Draft, draft–ietf–drums–02.txt, May 21, 1996.

J. Myers, et al., "Post Office Protocol—Version 3," Network Working Group, RFC 1725, Nov. 1994.

J. Pan, "Internet Security & Firewall Issues for NIIIP Virtual Enterprise," NIIIP OMB Meeting, Boca Raton, FL, Jan. 23–25, 1996.

J. Peek, et al., "MH & xmh, Email for USOIS &: Programmers," O'Reilly & Associates, Inc., Sebastopol, CA, 1995.

J. Postel, et al., "An Experimental Multimedia Mail System," ACM Transactions on Office Information Systems, vol. 6, No. 1, Jan. 1998.

J. Rosenberg, et al., An Overview of the Andrew Message System; Computer Communications Review, vol. 17:5, pp. 99–108, Apr. 1988.

J. B. Postel, RFC 0821, Simple Mail Transfer Protocol, HTTP://rfo–koeln.de/html, 80 pages, Aug. 1982.

J.K. Reichard, Leveraging E–Mail: PC Magazine: 241, 244 and 245 (May 1995).

Kent, J. "Browsing Electronic Mail: Experiences Interfacing a Mail System to a DBMS," Proceedings of the Fourteenth International Conference on Very Large Data Base, Los Angeles, CA, pp. 112–123, 1988.

J.R Vacca, "Mosaic: Beyond Net Surfing," BYTE Magazine, Jan. 1995.

K. Goldberg, "Beyond the Web: Manipulating the Real World," Computer Networks and IDSN Systems, 28, pp. 209–219, 1995.

K. Hofrichter, et al., "The BERKOM Multimedia–Mail Teleservice," Proceedings of the Fourth Workshop on Future Trends of Distributed Computing Systems, Lisbon, Portugal, pp. 23–30, Sep. 22–24, 1993.

K. Moore, "SMTP Service Extension for Delivery Status Notifications," Network Working Group, Internet–Draft of RFC 1891, Sep. 21, 1995.

K. Moore, et al., "An Extensible Message Format for Delivery Status Notifications," Network Working Group, Internet Draft, Sep. 1995.

K. Sollins et al., "Functional Requirements for Uniform Resources Names," Network Working Group, RFC 1737 Dec. 1994.

K.M. Savetz, "Magazines Without Paper," BYTE Magazine, Sep. 1993.

K.S. Morris, "A Technical Overview of MIME," Web Developer's Journal Archives, Mar. 1995.

M. Grand, "MIME Overview," downloaded from the Internet at www.mindspring.com/mgrand/mime.html, revised Oct. 26, 1993.

M. Rio, et al., "A framework for broadcasting and management of URIs," Computer Networks and ISDN Systems, 28, pp. 535–542, 1996.

M. Sherman, et al., "Buildings Hypertext on a Multimedia Toolkit: An Overview of Andres Toolkit Hypermedia Facilities," Proceedings of the First European Conference on Hypertext, pp. 13–24, France, Nov. 1990.

M. Sherman, et al., "Allocation of User–Interface Resources in the Andrew Toolkit," International Conference on Multimedia information Systems, pp. 161–272, 1991.

N. Borenstein et al., "MIME: Mechanisms for Specifying and Describing the Format of Internet Message Bodies," Nework Working Group, REC 1341, Jun. 1992.

N. Borenstein, "MIME (Multipurpose Internet Mail Extensions) Part One: Mechanisms for Specifying and Describing the Format of Internet Message Bodies," Network Working Group, RFC 1521, Sep. 1993.

N. Borenstein, et al., "A Multi–media Message System for Andrew," USENIX Winter Conference, Dallas, TX, pp. 37–42, Feb. 9–12, 1988.

N. Freed, et al., "Definition of the URL MIME External–Body Access–Type," Network Working Group, Internet Draft of RFC 2017 (Apr. 11, 1995) see also N. Freed et al., "Definition of the URL MIME External–Body Access–Type," Network Working Group, RFC 2017, Oct. 1996.

Novell Announces "Softsolutions" 4.1," PR Newswire, New Orleans, LA, May 9, 1995.

R.J. Vetter et al., "Mosaic, HTML, and the World Wide Web," IEEE Computer, 27, 1994.

S. Baker, "Hypertext Browsing on the Internet," UNIX Review: 21–27, 1994.

S. Baker, "Mosaic–Surfing at Home and Abroad," Meet the Shadow Future: 159–163, 1994.

S. Bradner, "The Internet Standards Process—Revision 3," Network Working Group, RFC 2026, 1996.

S. J. Vaughan–Nichols, "Internet Publishing Tools Proliferate," BYTE Magazine, Mar. 1995.

S. Sakata, et al., "A Distributed Interoffice Mail System," Multimedia Communications, pp. 106–116, Oct. 1985.

S.B. Jones, "Caught in the World Wide Web: MIT Moves Computer Documentation Online," Meet the Shadow Future: 187–189, 1994.

S.J. Vaughan–Nichols, "The Web Means Business," BYTE Magazine, Nov. 1994.

Schwartz, Barry K. and Stephen B. Weinstein, "Dual–Media Messaging Using Screen Telephone on the Telephone Network," IEEE International Conference on Communications '93, May 23–26, 1993, pp. 1183–1188, Technical Program, Conference Record, vol. 2/3.

T. Berners–Lee, "Universal Resources Identifier in WWW, A Unifying Syntax for the Expression and Address of Objects on the Network as used in the World–Wide–Web," Network Working Group, RFC 1630, Jun. 1994.

T. Berners–Lee, et al., "Hypertext Markup Language (HTML): A Representation of Textual Information and Metainformation for Retrieval and Interchange," Internet Draft, IIIR Working Group, 1993.

T. Berners–Lee, et al., "Hyptertext Markup Language–2.0," Network Working Group, RFC 1866, Nov. 1995.

T. Berners–Lee, et al., "Uniform Resource Locators (URL)," Network Working Group, RFC 1738, Dec. 1994.

T. W. Yan, et al., "From user access patterns to dynamic hypertext linking," Computer Networks and ISDN Systems, 28 pp. 1007–1014, 1996.

University of Cambridge Statistical Laboratory, "Using Mosaic for Xwindows," Internet Publication, Jul. 1994, downloaded from http://www.statslab.cam.ac.uk.

V. Gay et al., "Conception of a Multimedia Electronic Mail Based on Standards," Proceedings of the Fourth Workshop on Future Trends of Distributed Computing Systems, Sep. 22–24, 1993.

V.S. Wheatman, "Sorting Through the Secure Messaging Maze," Messaging Magazine, downloaded from the Internet at www.ema.org/html/pubs/nunv4n2/msgmaze.htm, Mar.–Apr. 1998.

Warren, "Voice/fax Combos," *Computer Technology* Sep./Oct. 1994, p. 88.

E. Moeller, et al., "The BERKOM multimedia–mail teleservice," Computer Communications, vol. 18:2, pp. 89–102, Feb. 1995.

G. Vaudreuil, "The Multipart/Report Content Type for the Reporting of Mail System Administrative Messages," Network Working Group, Internet Draft, Sep. 1995.

G. Vaudreuil, "Enhanced Mail System Status Codes," Network Working Group, Internet Draft, Jun. 1995.

"Plaintiff's Opposition claim Construction Brief" in *j2 Global Communications, Inc. v. Venali, Inc.* CV 04–1172 (DDP) (AJWx).

"Brief in Opposition to Plaintiff J2's Opening Claim Construction Brief" in *j2 Global Communications, Inc., v. Venali, Inc.* CV 04–1172 (DDP) (AJWx).

"Plaintiff's Opening Claim Construction Brief" in j2 Global Communications, Inc., CV 04–1172 (DDP) (AJWx).

"Opening Claim Construction Brief" in *j2 Global Communication, Inc. v. Venali, Inc.*, CV 04–1172 (DDP) (AJWx).

"Plaintiff's Opening Markman Brief" in *j2 Global Communication, Inc. v. CallWave, Inc.*, CA 04–7068 DDP AJWx.

"Plaintiff's Opposition Markman Brief" in *j2 Global Communications, Inc. v. CallWave, Inc.*, CA 04–7068 DDP AJWx.

"Defendant CallWave, Inc.'s Opening Claim Construction Brief" in *j2 Global Communications, Inc. v. CallWave, Inc.*, CA 04–7068 DDP AJWx.

"Defendent CallWave Opposition to Plaintiff j2's Opening Markman Brief" in *j2 Global Communications, Inc. v. CallWave, Inc.*, CA 04–7068 DDP AJWx.

"Declaration of Professor Walter Scacchi Regarding Defendant CallWave, Inc.'s Opening Claim Construction Brief" in *j2 Global Communications, Inc. v. CallWave, Inc.*, CA 04–7068 VBKx.

Stuart Melnitsky, Fax Server Face Off, in Network World, Apr. 15, 1996, pp. 43–45.

Stephen Loudermilk, Trio Set to Roll Out Fax Gear for LANs, in PC Week, Aug. 17, 1992, pp. 47–48.

Wayne Rash, The Fax of the Matter, in Information Week, May 20, 1996.

Yvonee L. Lee, Vendors Showcase Integrated Telepony Solutions, in Infoworld, at vol. 18, No. 10, p. 18 (Mar. 4, 1996).

Author Unknown, Call and Voice Processing PC Board Roundup ( Buyers Guide), in Teleconnect, Dec. 1995, v13, n12, pp. 1–6.

Andrew Eberle, The Path Taken: Inbound Routing, in Network World, p. 101.

Chance Fullner et al., A TCP/IP Network Facsimile System Built from Publicly Available Software, in Association for Computing Machinery (ACM), 1992, ref. No. ACM 089791–472–4/92/0002/525, pp. 525–529.

Ed Liebowitz, The Dialogic VAR Parade; Open Voice Processing for Art Dealers, the Blind, the Dallas Cowboys and the RBOCs, in Teleconnect, Apr. 1993, v11, n4, p. 40(3).

Paul Kinnucan, What's New in the Fax World, in Systems Integration, Feb. 1990, v23, n2, p. 50(7).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 13 are determined to be patentable as amended.

Claims 2–12 and 14–22, dependent on an amended claim, are determined to be patentable.

New claims 23–40 are added and determined to be patentable.

1. A system comprising:
    a set of switches coupled to a circuit switched network for receiving a set of incoming call signals, wherein [the] *each* incoming call signal includes an inbound address *uniquely associated with a user account and at least one destination address on a packet switched network*, and wherein a switch in the set of switches redirects an incoming *call* signal, *including the inbound address,* from a first communications server to a second communications server if a first condition occurs; and,
    a set of communications servers coupled to the set of switches for receiving the set of incoming call signals, each communications server being coupled to a *packet switched* network and containing a message processing resource configured to process a received audio message *contained within a particular one of the incoming call signals* into a digital representation, wherein each communications server further comprises a trunk line interface to extract [the] *a particular* inbound address *from the particular one of the incoming call signals and wherein the second communications server* stores the *particular* inbound address[,a set of final destination addresses] *and the at least one destination address* and account status *information uniquely associated with the particular inbound address and the user account*, and the message processing resource is further configured to determine, based on the *particular* inbound address, [a] *the* user account and [a] *the at least one* destination address on [a] *the* packet switched network and *to* send the digital representation to the *at least one* destination *address*,
    wherein the *particular* inbound address is assigned to the *particular* user account and the [outbound address] *at least one destination address* comprises at least one email address.

13. A method comprising:
    receiving a first incoming call signal destined for a first communications server for processing of an audio message into a digital representation;
    determining if a first condition has occurred;
    redirecting the first incoming call signal from the first communications server to a second communications server based on the determining of the first condition, wherein the *first* incoming call signal includes [an] *a particular* inbound address *uniquely associated with a user account and at least one destination address on a packet switched network, and wherein the particular inbound address remains unchanged during the redirecting*;
    extracting the *particular* inbound address;
    determining, based on the *particular* inbound address, a user account status and [a] *the at least one* destination address on [a] *the* packet switched network; and,
    sending the digital representation to the *at least one* destination *address*, wherein the *particular* inbound address is *uniquely* assigned to the user account and the *at least one* destination *address* comprises at least one email address.

23. *A method comprising:*
    *receiving a first incoming call signal destined for a first communications server for processing of an audio message into a digital representation;*
    *using a system management unit to communicate with the first communications server to determine if a first condition has occurred;*
    *using the system management unit to re-allocate resources by redirecting the first incoming call signal from the first communications server to a second communications server based on the determining of the first condition, wherein the first incoming call signal includes a particular inbound address uniquely associated with a user account and at least one destination address on a packet switched network, and wherein the particular inbound address remains unchanged during the redirecting;*
    *extracting the particular inbound address;*
    *determining, based on the particular inbound address, a user account status and the at least one destination address on the packet switched network; and,*
    *sending the digital representation to the at least one destination address, wherein the particular inbound address is uniquely assigned to the user account, the at least one destination address comprises at least one email address and the system management unit ensures that the digital representation is routed to the at least one email address.*

24. *The method of claim 23, where the audio message is a facsimile message and the digital representation of the audio message is a graphics file.*

25. *The method of claim 23, further including:*
    *determining if the audio message contains a facsimile message or a voice message; and*
    *digitizing the audio message if the audio message contains the voice message and receiving the facsimile message if the audio message contains the facsimile message.*

26. *A method comprising:*
    *receiving a first incoming call signal destined for a first communications server for processing of an audio message into a digital representation;*
    *determining if a first condition has occurred;*
    *redirecting the first incoming call signal from the first communications server to a second communications server based on the determining of the first condition, wherein the first incoming call signal includes a particular inbound address uniquely associated with a user account and at least one destination address on a* packet switched network, and wherein the particular inbound address remains unchanged during the redirecting;

re-assigning all users being handled by the first communications server to the second communications server if the first condition includes a malfunction of the first communications server;

off-loading only incoming calls for which the first communications server does not have available resources to process if the first condition includes an overloading of the first communications server;

extracting the particular inbound address;

determining, based on the particular inbound address, a user account status and the at least one destination address on the packet switched network; and sending the digital representation to the at least one destination address, wherein the particular inbound address is uniquely assigned to the user account and the at least one destination address comprises at least one email address.

27. The method of claim 26, where the audio message is a facsimile message and the digital representation of the audio message is a graphics file.

28. The method of claim 26, further including:

determining if the audio message contains a facsimile message or a voice message; and digitizing the audio message if the audio message contains the voice message and receiving the facsimile message if the audio message contains the facsimile message.

29. A method comprising:

receiving a first incoming call signal destined for a first communications server for processing of an audio message into a digital representation;

determining if a first condition has occurred;

using a database server to configure a second communications server to accept the first incoming call signal based on the determining of the first condition;

redirecting the first incoming call signal from the first communications server to the second communications server based on the determining of the first condition, wherein the first incoming call signal includes a particular inbound address uniquely associated with a user account and at least one destination address on a packet switched network, and wherein the particular inbound address remains unchanged during the redirecting;

extracting the particular inbound address;

determining, based on the particular inbound address, a user account status and the at least one destination address on the packet switched network; and, sending the digital representation to the at least one destination address, wherein the particular inbound address is uniquely assigned to the user account, the at least one destination address comprises at least one email address, the database server stores a duplicate copy of the particular inbound address, the email address and the account status for a plurality of users, and the first and second communications servers store a subset of information stored on the database server.

30. The method of claim 29, where the audio message is a facsimile message and the digital representation of the audio message is a graphics file.

31. The method of claim 29, further including:

determining if the audio message contains a facsimile message or a voice message; and digitizing the audio message if the audio message contains the voice message and receiving the facsimile message if the audio message contains the facsimile message.

32. A system comprising:

a system management unit to communicate with a first communications server to determine if a first condition has occurred;

a set of switches coupled to a circuit switched network for receiving a set of incoming call signals, wherein a particular one of the incoming call signals includes a particular inbound address uniquely associated with a user account and at least one destination address on a packet switched network, and wherein the system management unit re-allocates resources by causing a switch in the set of switches to redirect the particular one of the incoming call signals, including the particular inbound address, from the first communications server to a second communications server if the first condition occurs; and, a set of communications servers coupled to the set of switches for receiving the set of incoming call signals, each communications server being coupled to a packet switched network and containing a message processing resource configured to process a received audio message contained within the particular incoming call signal into a digital representation, wherein each communications server further comprises a trunk line interface to extract the particular inbound address from the particular one of the incoming call signals and wherein the second communications server stores the particular inbound address and the at least one destination address and account status information uniquely associated with the particular inbound address, and the message processing resource is further configured to determine, based on the particular inbound address, the user account and the at least one destination address on the packet switched network and to send the digital representation to the at least one destination address, wherein the particular inbound address is uniquely assigned to the user account, the at least one destination address comprises at least one email address and the system management unit ensures that the digital representation is routed to the at least one email address.

33. The system of claim 32, where the audio message is a facsimile message and the digital representation of the audio message is a graphics file.

34. The system of claim 32, where the message processing resource further comprises a processor to:

determine if the audio message contains a facsimile message or a voice message; and, digitize the audio message if the audio message contains the voice message and receive the facsimile message if the audio message contains the facsimile message.

35. A system comprising:

a set of switches coupled to a circuit switched network for receiving a set of incoming call signals, wherein a particular one of the incoming call signals includes a particular inbound address uniquely associated with a user account and at least one destination address on a packet switched network, and wherein a switch in the set of switches redirects the particular one of the incoming call signals, including the particular inbound address, from a first communications server to a second communications server if a first condition occurs;

a system management unit to re-assign all users being handled by the first communications server to the second communications server if the first condition includes a malfunction of the first communications server, and to off-load only incoming calls for which the first communications server does not have available resources to process if the first condition includes an overloading of the first communications server; and, a set of communications servers coupled to the set of switches for receiving the set of incoming call signals, each communications server being coupled to a packet switched network and containing a message processing resource configured to process a received audio message contained within the particular one of the incoming call signals into a digital representation, wherein each communications server further comprises a trunk line interface to extract the particular inbound address from the particular one of the incoming call signals and wherein the second communications server stores the particular inbound address and the at least one destination address and account status information uniquely associated with the particular inbound address, and the message processing resource is further configured to determine, based on the particular inbound address, the user account and the at least one destination address on the packet switched network and to send the digital representation to the at least one destination address, wherein the particular inbound address is uniquely assigned to the user account and the at least one destination address comprises at least one email address.

36. The system of claim 35, where the audio message is a facsimile message and the digital representation of the audio message is a graphics file.

37. The system of claim 35, where the message processing resource further comprises a processor to:

determine if the audio message contains a facsimile message or a voice message; and, digitize the audio message if the audio message contains the voice message and receive the facsimile message if the audio message contains the facsimile message.

38. A system comprising:

a set of switches coupled to a circuit switched network for receiving a set of incoming call signals, wherein a particular one of the incoming call signals includes a particular inbound address uniquely associated with a user account and at least one destination address on a packet switched network, and wherein a switch in the set of switches redirects the particular one of the incoming call signals, including the particular inbound address, from a first communications server to a second communications server if a first condition occurs;

a database server to configure the second communications server to accept the particular one of the incoming call signals based on a determining of the first condition; and, a set of communications servers coupled to the set of switches for receiving the set of incoming call signals, each communications server being coupled to a packet switched network and containing a message processing resource configured to process a received audio message contained within the particular one of the incoming call signals into a digital representation, wherein each communications server further comprises a trunk line interface to extract the particular inbound address from the particular one of the incoming call signals and wherein the second communications server stores the particular inbound address and the at least one destination addresses and account status information uniquely associated with the particular inbound address, and the message processing resource is further configured to determine, based on the particular inbound address, the user account and the at least one destination address on the packet switched network and to send the digital representation to the at least one destination address, wherein the particular inbound address is uniquely assigned to the user account, the at least one destination address comprises at least one email address, the database server stores a duplicate copy of the particular inbound address, the email address and the account status for a plurality of users, and the first and second communications servers store a subset of information stored on the database server.

39. The system of claim 38, where the audio message is a facsimile message and the digital representation of the audio message is a graphics file.

40. The system of claim 38, further including:

determining if the audio message contains a facsimile message or a voice message; and, digitizing the audio message if the audio message contains the voice message and receiving the facsimile message if the audio message contains the facsimile message.

* * * * *